(12) United States Patent
Goldschmidt et al.

(10) Patent No.: US 7,967,183 B2
(45) Date of Patent: *Jun. 28, 2011

(54) REPAIR SOLDERING METHOD FOR REPAIRING A COMPONENT WHICH COMPRISES A BASE MATERIAL WITH AN ORIENTED MICROSTRUCTURE

(75) Inventors: Dirk Goldschmidt, Moers (DE); Matthias Oechsner, Mülheim an der Ruhr (DE); Michael Ott, Mülheim an der Ruhr (DE); Uwe Paul, Ratingen (DE); Ursula Pickert, Mülheim an der Ruhr (DE); Eckart Schumann, Mülheim an der Ruhr (DE); Beate Seiler, Sint-Gillis-Waas (BE); Robert Singer, Erlangen (DE); Jan Steinbach, Berlin (DE); Andreas Volek, Erlangen (DE); Volker Vosberg, Mülheim an der Ruhr (DE)

(73) Assignees: Siemens Aktiengesellschaft, Munich (DE); MTU Aero Engines GmbH, Munich (DE)

( * ) Notice: Subject to any disclaimer, the term of this patent is extended or adjusted under 35 U.S.C. 154(b) by 724 days.

This patent is subject to a terminal disclaimer.

(21) Appl. No.: 10/588,024

(22) PCT Filed: Jan. 28, 2005

(86) PCT No.: PCT/EP2005/000884
§ 371 (c)(1),
(2), (4) Date: May 31, 2007

(87) PCT Pub. No.: WO2005/075136
PCT Pub. Date: Aug. 18, 2005

(65) Prior Publication Data
US 2007/0228108 A1 Oct. 4, 2007

(30) Foreign Application Priority Data

Feb. 3, 2004 (EP) .................................. 04002332

(51) Int. Cl.
*B23K 31/02* (2006.01)
(52) U.S. Cl. .......................... 228/119; 228/245; 228/225
(58) Field of Classification Search .................. 228/119, 228/210, 208, 225, 245, 246, 248.1, 262.3, 228/262.42, 262.45, 262.31
See application file for complete search history.

(56) References Cited

U.S. PATENT DOCUMENTS

| | | | |
|---|---|---|---|
| 4,705,203 A * | 11/1987 | McComas et al. | 228/119 |
| 4,830,934 A | 5/1989 | Ferrigno et al. | |
| 4,878,953 A | 11/1989 | Saltzman et al. | |
| 4,900,394 A | 2/1990 | Mankins | |
| 4,987,736 A | 1/1991 | Ciokajlo et al. | |

(Continued)

FOREIGN PATENT DOCUMENTS

CN 1196989 A 10/1998

(Continued)

*Primary Examiner* — Roy King
*Assistant Examiner* — Michael Aboagye

(57) ABSTRACT

The invention relates to a method for repairing components comprising a base material with an oriented microstructure, wherein the repair point comprises a correspondingly oriented microstructure as the surrounding base material. According to the inventive method, solder is applied in the region of a point which is to be repaired and is soldered to the component by means of a heating effect produced by a device. A temperature gradient, i.e., approximately a temperature characteristic, is produced during the heating effect, said temperature characteristic ranging from a high to a low temperature in the region of the point which is to be repaired.

5 Claims, 2 Drawing Sheets

U.S. PATENT DOCUMENTS

| | | |
|---|---|---|
| 5,523,170 A | 6/1996 | Budinger et al. |
| 5,628,814 A | 5/1997 | Reeves et al. |
| 5,666,643 A | 9/1997 | Chesnes et al. |
| 5,783,318 A | 7/1998 | Biondo et al. |
| 5,806,751 A | 9/1998 | Schaefer et al. |
| 5,873,703 A | 2/1999 | Kelly et al. |
| 5,914,059 A * | 6/1999 | Marcin et al. ............ 219/121.66 |
| 6,050,477 A * | 4/2000 | Baumann et al. ............ 228/119 |
| 6,283,356 B1 * | 9/2001 | Messelling .................... 228/119 |
| 6,343,641 B1 * | 2/2002 | Gigliotti et al. ............ 164/122.1 |
| 6,454,885 B1 | 9/2002 | Chesnes et al. |
| 6,495,793 B2 | 12/2002 | Tewari |
| 6,503,349 B2 * | 1/2003 | Pietruska et al. ............. 148/562 |
| 6,523,599 B1 * | 2/2003 | Balliel ........................ 164/338.1 |
| 6,565,678 B2 | 5/2003 | Fairchild et al. |
| 2001/0001415 A1 * | 5/2001 | Gerasimov et al. ......... 164/122.1 |
| 2003/0066177 A1 | 4/2003 | Schnell et al. |
| 2003/0075587 A1 | 4/2003 | Smashey et al. |

FOREIGN PATENT DOCUMENTS

| | | |
|---|---|---|
| CN | 1339996 A | 3/2002 |
| DE | 19714530 A1 | 10/1998 |
| EP | 0 089 090 A1 | 9/1983 |
| EP | 1 258 545 A1 | 11/2002 |
| EP | 1 340 567 A1 | 9/2003 |
| WO | 0141970 A1 | 6/2001 |

* cited by examiner

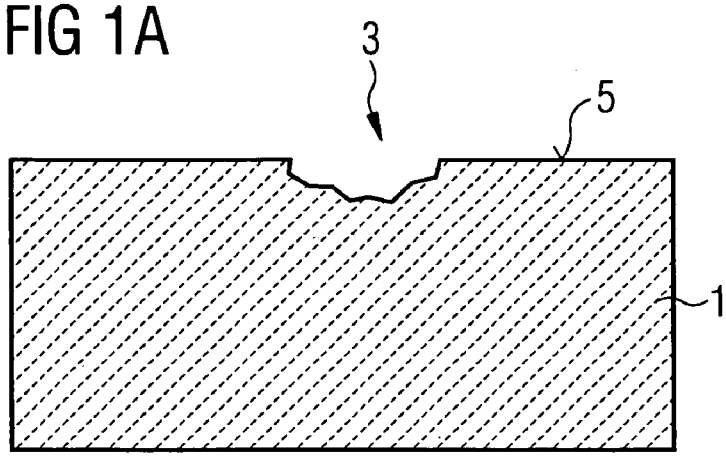
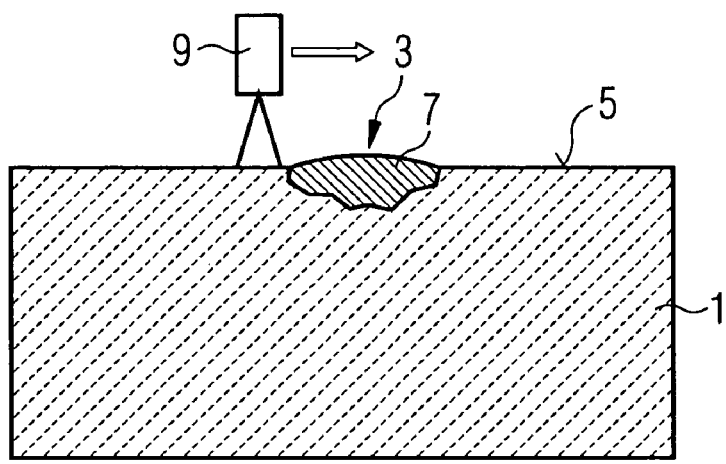
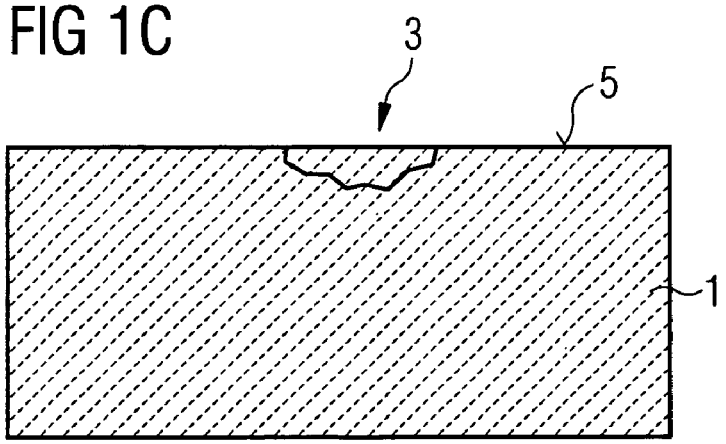

REPAIR SOLDERING METHOD FOR REPAIRING A COMPONENT WHICH COMPRISES A BASE MATERIAL WITH AN ORIENTED MICROSTRUCTURE

CROSS REFERENCE TO RELATED APPLICATIONS

This application is the US National Stage of International Application No. PCT/EP2005/000884, filed Jan. 28, 2005 and claims the benefit thereof. The International Application claims the benefits of European Patent application No. 04002332.7 filed Feb. 3, 2004. All of the applications are incorporated by reference herein in their entirety.

FIELD OF THE INVENTION

The present invention relates to a repair method for repairing a component which comprises a base material with an oriented microstructure, as well as to a component having a base material which comprises an oriented microstructure, and to a solder site where a solder is soldered to the base material.

BACKGROUND OF THE INVENTION

For example, components of turbines are nowadays quite often made of materials with an oriented microstructure. Particularly monocrystalline materials and materials that have a grain structure, the extent of the grains having a common preferential direction, are to be regarded here as materials with an oriented microstructure. For example, the grains may have a larger dimension in a particular preferential direction than in the other directions. Components with such a grain structure are also referred to as directionally solidified components.

Strongly loaded components, for instance turbine blades, are subjected to heavy thermal and mechanical stresses during operation, which can lead to material fatigue and therefore cracks. Since it is relatively expensive to produce components from base materials that have an oriented microstructure, it is generally necessary to repair such components after the onset of damage. This restores the ability to operate and the component can be used for a further revision period.

Soldering, for example, is one way of repairing damaged components. For such soldering, a solder is applied onto the material of the component in the region of the damage, i.e. onto the base material, and bonded to the base material by means of a heating effect. With the hitherto conventional procedure, however, the solder material does not have a monocrystalline or directionally solidified structure after soldering. Compared to an oriented microstructure, moreover, an unordered structure has poorer material properties—especially in the high temperature range—so that the solder site has inferior material properties than the surrounding base material.

Welding methods, by which oriented microstructures can also be generated in the welded structures, are also available for repairing damaged components with an oriented microstructure. Such a method is disclosed, for example, in EP 089 090 A1.

Other methods or usable solder powders are known from the publications U.S. Pat. Nos. 6,283,356, 4,705,203, 4,900, 394, 6,565,678, 4,830,934, 4,878,953, 5,666,643, 6,454,885, 6,503,349, 5,523,170, 4,878,953, 4,987,736, 5,806,751, 5,783,318, 5,873,703.

U.S. Pat. No. 6,050,477 discloses a method for bonding two component elements, the solder being applied over a large area between the two component parts and a temperature gradient being used in order to generate the same oriented microstructure.

US-A 2003/0075587 A1 discloses a method for repairing a component with a directionally solidified microstructure, although the site to be repaired does not have the same microstructure as the component to be repaired.

U.S. Pat. No. 6,495,793 discloses a repair method for nickel-based superalloys in which a laser is used, the laser melting the material which is supplied via a material feeder. Information about the microstructure of the component or the repair site is not given.

EP 1 258 545 A1 discloses a soldering method without temperature gradients.

EP 1 340 567 A1 discloses a method in which additional material is supplied to the pre-melted site to be repaired. A temperature gradient is likewise used in order to treat the components with an oriented microstructure.

U.S. Pat. No. 4,878,953 discloses a method for repairing a component with an oriented microstructure, in which material is applied onto the repair site by means of powder and this site has a fine-grained microstructure.

Welding methods, however, melt the base material of the component to be repaired. Structurally supporting regions of a component should therefore not be welded, since melting the base material would cause the integrity of the oriented structure to be lost. Components with an oriented microstructure are therefore repaired by means of welding methods only when the damage does not lie in structurally supporting regions of the component. When the damage lies in a structurally supporting region of the component and if an oriented weld structure is required, however, then this component is declared irreparable and replaced with an intact component.

SUMMARY OF THE INVENTION

It is therefore an object of the invention to provide a repair method with which damaged components, which comprise a base material with an oriented microstructure, can be repaired even if the damage lies in a structurally supporting region of the component.

It is another object of the invention to provide a component having a base material, which comprises an oriented microstructure, and a repair site in a structurally supporting region of the component, in which the material of the repair site has improved material properties compared to conventional components with a component repair site present in a structurally supporting region.

The first object is achieved by a repair method as claimed in the claims, and the second object is achieved by a component as claimed in the claims. The dependent claims contain advantageous configurations of the present invention.

In the method according to the invention for repairing a component which comprises a base material with an oriented microstructure, the repair is carried out so that the repaired site has a microstructure oriented correspondingly as the surrounding base material. The base material may in particular be a nickel-based material. In the method according to the invention, a solder is applied in the region of a site to be repaired and soldered to the component by means of a heating effect. A temperature gradient, i.e. a temperature profile from a higher temperature to a lower temperature, is generated in the region of the site to be repaired during the heating effect.

Only the solder, but not the base material, is melted and allowed to resolidify during the soldering process, the solder entering into a bond with the base material so that the repair method according to the invention can be employed even in structurally supporting regions of the component, without the good material properties of the base material being compromised. The temperature gradient can achieve epitaxial growth and solidification of the solder, that is to say growth in which the crystalline orientation of the solder during solidification is determined by that of the substrate, i.e. the base material. The temperature gradient therefore makes it possible to create a monocrystalline solder region or other oriented microstructure in the soldered solder with similarly improved material properties compared to an unoriented microstructure. The oriented growth takes place in the direction of the temperature gradient, i.e. in the direction from the lower temperature to the higher temperature. Owing to the oriented growth and the resulting oriented microstructure, the soldered solder has similarly good material properties as the base material of the component.

The temperature gradient in the repair method according to the invention is preferably generated so that it extends in the direction of the orientation of the oriented microstructure of the base material of the component. It is thereby possible to achieve oriented growth of the solidifying solder in the direction of the orientation of the oriented microstructure of the base material.

In an advantageous refinement of the repair method according to the invention, the solder comprises a first constituent with a melting temperature which is lower, preferably much lower than the melting temperature of the base material of the component, and a second constituent with a high strength and a melting temperature which lies above the melting temperature of the first constituent but below the melting temperature of the base material down to the melting temperature of the base material. In this refinement of the method, the solder is applied in the region of the site to be soldered so that the proportion of first constituent in the solder in the local vicinity of the base material is higher than in a region further away from the base material. In this configuration of the method, the first constituent with the lower melting temperature is used to establish the bonding of the solder with the base material, while the constituent with the high melting temperature provides the durability (strength) of the soldered solder. Since the solder comprises a higher proportion of the first constituent in the region of the base material, it is possible to establish good bonding of the soldered solder with the base material. On the other hand, there is comparatively more of the second constituent, i.e. the constituent with the higher durability, in regions which are at a greater distance from the base material, so that regions of the solder site exposed to stronger loading during subsequent operation of the component have a high durability.

In order to provide the heating effect, in the method according to the invention it is possible to employ all heating processes that are capable of producing a temperature gradient in the region of a site to be soldered, i.e. in the solder. For example, optical heating processes e.g. by means of a laser or conventional illuminating devices, or inductive heating processes e.g. by means of heating coils, may be utilized. As an alternative, it is also possible to use a casting furnace for casting materials with a directionally oriented microstructure.

For example, a so-called "hot box" may be used for inductive heating. The term "hot box" is essentially intended to mean a device with a compartment for holding the component to be repaired, as well as an induction coil arranged moveably in the compartment for local heating of the component. The recess may be flushed with an inert gas, for example argon, during the soldering process.

In one refinement of the repair method according to the invention, a heat treatment of the base material may be integrated into the process of soldering the solder. This makes it possible to carry out rejuvenation of the base material properties simultaneously with the repair.

The component according to the invention comprises a base material, which has an oriented microstructure, and at least one repair site in which the repair material is bonded to the base material, the repair material having a microstructure oriented correspondingly as the base material. It is distinguished in that the repair site lies in a structurally supporting region of the component. The component may in particular be designed as a turbine component, for example as a turbine blade.

BRIEF DESCRIPTION OF THE DRAWINGS

Other features, properties and advantages of the present invention will be found in the following description of an exemplary embodiment with reference to the appended drawings.

FIGS. 1a-1c show an exemplary embodiment of the repair method according to the invention.

DETAILED DESCRIPTION OF THE INVENTION

Figure 2:
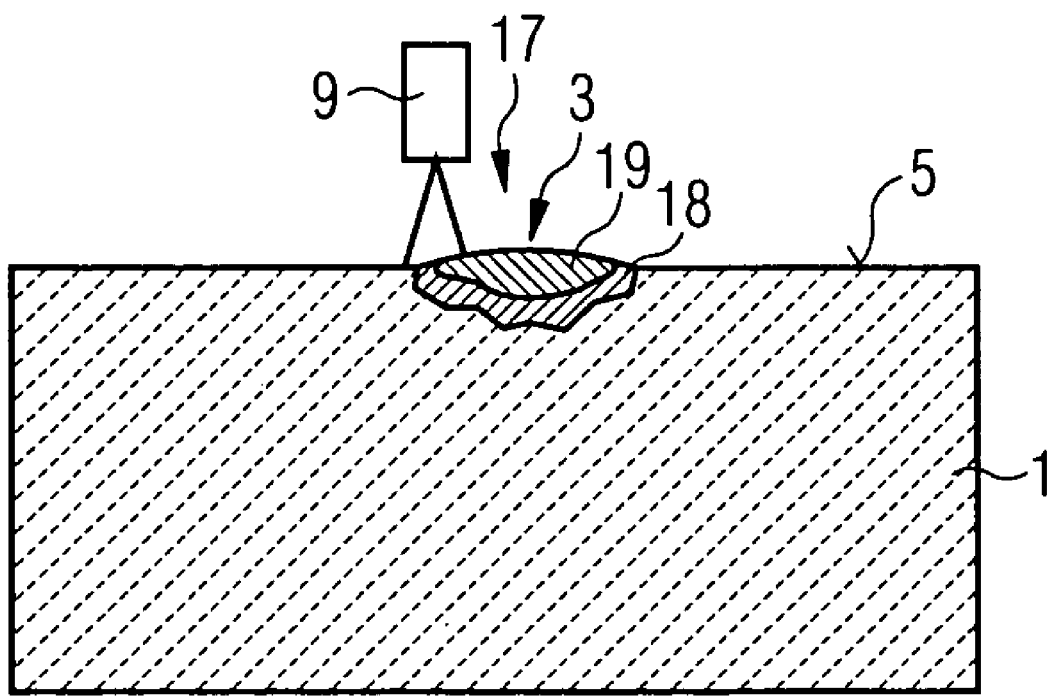
FIG. 2 shows a variant of the exemplary embodiment.

FIG. 1a represents a schematic view of a damaged component 1.

The base material of the component 1 comprises a nickel-based alloy and has an oriented microstructure, which is indicated by short diagonally extending lines in the figures. The damage 3 to the component 1 lies in the region of the surface 5 and is represented as an indentation in the figure.

In order to repair the damaged component 1, a solder 7 which is in powder form in the present exemplary embodiment is applied onto the precleaned damaged site 3 and subsequently soldered to the base material of the component 1 by means of a heating effect (FIG. 1b). In particular, all the required solder 7 is introduced into the precleaned damaged site 3 optionally with a small excess, and in particular not added step-wise during the melting.

It is advantageous that the material composition of the solder should be similar to that of the component. In particular, however, the solder 7 must comprise a constituent whose melting temperature is lower than the melting temperature of the base material of the component 1 so that the solder 7 is melted by means of the heating effect, but the base material of the component 1 is not.

In order to exert the heating effect on the solder 7, a laser 9 which irradiates the solder to be melted and thus supplies it with the heat necessary for melting is provided in the present exemplary embodiment.

According to the invention, a temperature gradient is deliberately produced in the region of the damage 3 in the preferential direction of the microstructure of the base material during the soldering process. The temperature gradient may be produced by moving the component 1 and the laser 9 relative to each other. In the exemplary embodiment, therefore, the laser is guided parallel to the surface 5 over the solder 7. The speed with which the laser 9 is guided over the solder 7 will then be selected so that the desired temperature gradient is set up in the region of the damage 3, i.e. the solder 7. The temperature gradient then induces the creation of an epitaxially oriented microstructure when the solder 7 melted by the laser 9 resolidifies. The steepness of the temperature gradient may be adjusted for example through the speed with which the laser 9 and the component 1 are moved relative to each other, or through the laser power. The term steepness of the gradient is intended here to mean the increase or decrease in temperature per unit length. The steepness of the temperature gradient, which leads to the creation of an oriented microstructure in the solidifying solder, depends on the composition of the solder.

In the present exemplary embodiment, the preferential direction of the oriented microstructure in the base material of the component 1 extends from left to right within the plane of the drawing. In order to induce the creation of an oriented microstructure in the solidifying solder 7, the preferential direction of which coincides with that in the base material, the laser 9 is moved relative to the component 1 parallel to the preferential direction of the oriented microstructure of the base material.

FIG. 1c shows the component 1 after repairing the damage 3. As indicated by the diagonally extending lines in the region of the now solidified solder 7, the solidified solder 7 i.e. the repair material comprises an oriented microstructure which has the same preferential direction as the oriented microstructure of the base material of the component 1.

The laser 9 with its laser beam may also be expanded so that, for example, it irradiates and in any event thereby fully heats the entire solder.

Movement of the laser is thus not absolutely necessary. The dissipation of heat from the solder 7 into the substrate of the component 1 creates a temperature gradient inside the solder 7. The temperature is highest at the outer surface of the solder 7 and it is cooler at the interface of the solder 7 with the substrate of the component 1. Optionally, the component 1 may be cooled or heated on the rear side opposite the damage 3, or somewhere else, so that a desired specific temperature gradient is set up as a function of the geometry of the component 1 and the damage 3.

In the present exemplary embodiment, a laser 9 has been used in order to supply the heat. As an alternative, however, it is also possible to use other optical heating methods, in particular illumination with a conventional illuminating device. Instead of optical heating methods, furthermore, it is also possible to use inductive heating methods in which the solder is heated by means of heating coils. Lastly, it is also possible to use special heating furnaces, for instance a so-called "hot box" or a casting furnace for producing a cast piece with a directionally oriented microstructure. In any event, the method used must be suitable for generating a temperature gradient in the direction desired for the solidification in the region of the damage, or the damage filled with solder. When a furnace is used, for example, this may be done with a stationary furnace which makes it possible to adjust the heating effect in different regions of the furnace.

A variant of the exemplary embodiment represented in FIGS. 1a to 1c is represented in FIG. 2. In the variant of the exemplary embodiment, the solder 17 applied onto the damaged site 3 comprises two constituents, the first of which constituents has a melting temperature much lower than that of the base material of the component 1. The second constituent, on the other hand, has a melting temperature which lies in the range between the melting temperature of the first constituent and the melting temperature of the base material. Furthermore, the second constituent also has in particular a high strength, for instance of the order of magnitude of the base material.

The solder 17 in powder form is applied onto the pre-cleaned damaged site 3 in such a way that a solder composition 18 in which the first constituent makes up a relatively high proportion of the powder is applied first. A solder composition 19, in which the first constituent is reduced relative to the second constituent, is subsequently applied. When the solder 17 is now soldered to the base material, the high proportion of the first constituent i.e. the constituent with the lower melting temperature facilitates simple soldering of the solder to the base material, while the solder composition 19 in which the proportion of the first constituent is reduced ensures a high strength of the repaired site.

It is likewise possible for the solder composition 18 to ensure a high strength of the-site 3 to be repaired, and for the solder composition 19 closer to the surface to comprise greater oxidation and/or corrosion protection.

Instead of this two-layered structure of the solder 7, the solder 7 in the site 3 to be repaired may also comprise a material gradient from the bottom of the site 3 to the surface 5 of the component, in which the composition of the solder 7 varies continuously.

In both alternative embodiments of the method according to the invention, the heating effect for soldering the solder 7, 17 to the base material of the component 1 may also be used simultaneously to carry out a heat treatment of the base material, so as to permit rejuvenation of the base material properties.

In the described exemplary embodiment and its variant, the solder is applied in powder form onto the site to be repaired. As an alternative, however, it may also be applied as a film or paste.

The powder of the solder is present as a nanopowder, for example, i.e. the grain sizes of the powder are less than 500 or less than 300 or less than 100 nanometers. This is because it has been found that a nanopowder solder has a lower melting temperature than a conventional powder with micrometer size grains. The powder of the solder may likewise consist of a mixture of nanopowder and conventional powder, i.e. a powder which has grain sizes in the micrometer range. The melting temperature reduction can thereby be adjusted in a controlled way. The film or paste, by means of which the solder is applied, may likewise partially or fully comprise a powder of nanopowder.

The advantage over the prior art is that here the powder is not supplied via a material feeder, but is supplied pre-compacted to the site 3 to be repaired. It is virtually impossible to supply a nanopowder through a nozzle to a site to be repaired, as is known in the prior art, since the grains of the nanopowder are much too small and would spread out over a very large width.

The invention claimed is:

1. A repair method for repairing a component having a base material with an oriented microstructure, comprising:
   applying a solder in a region of the component to be repaired wherein the solder comprises a constituent whose melting temperature is lower than the melting temperature of the component base material; and
   heating the solder by directly irradiating the solder with a laser beam;
   melting the solder material by the laser beam wherein the component base material is not melted;
   choosing a speed of the laser beam relative to the component or a power of the laser beam for generating a temperature gradient in the region of the component to be repaired during the heating step to produce an oriented microstructure in the repaired site which comprises the same oriented microstructure as the surrounding base material, wherein the solder comprises a first constituent with a melting temperature lower than a melting temperature of the component base material and a second constituent having a high durability and a melting temperature greater than the first constituent melting temperature but below the base material melting temperature so that both the first constituent and the second constituent in the solder are melted by the laser beam but the component base material is not melted, wherein a first solder composition in which the first constituent makes up a high proportion is applied first to establish bonding with the component base material, and a second solder composition in which the first constituent is reduced relative to the second constituent is subsequently applied to increase the strength of the component.

2. The repair method as claimed in claim 1, wherein the temperature gradient is aligned so that it extends in the direction of the orientation of the oriented microstructure of the component base material.

3. The repair method as claimed in claim 1, wherein the base material is heat treated during the soldering step.

4. The repair method as claimed in claim 3, wherein the solder is in the form of a powder, paste or film.

5. The repair method as claimed in claim 4, wherein the solder powder is a nanopowder.

* * * * *